H. L. WHITMAN.

Cider-Mills.

No. 5,890. Reissued May 26, 1874.

*Witnesses:~*

C. C. Poole.
R. N. Dyer.

*Inventor:~*

Henry L. Whitman
by Geo. W. Dyer & Co
Attys.

AM. PHOTO-LITHOGRAPHIC Co. N.Y. (OSBORNE'S PROCESS.)

UNITED STATES PATENT OFFICE.

HENRY L. WHITMAN, OF ST. LOUIS, MISSOURI.

IMPROVEMENT IN CIDER-MILLS.

Specification forming part of Letters Patent No. 133,133, dated November 19, 1872; reissue No. 5,890, dated May 26, 1874; application filed April 14, 1874.

*To all whom it may concern:*

Be it known that I, HENRY L. WHITMAN, of St. Louis, in the county of St. Louis and State of Missouri, have invented a new and useful Improvement in Cider-Mills; and I do hereby declare that the following is a full and exact description of the same, reference being had to the accompanying drawing and to the letters of reference marked thereon.

Figure 1:
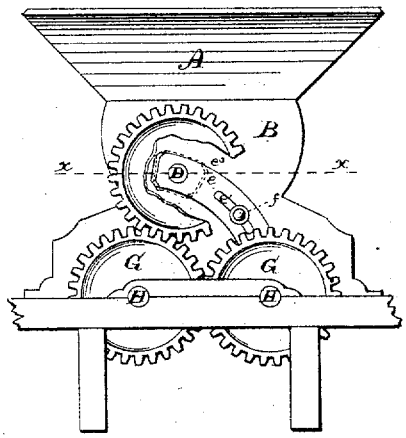
Figure 2:
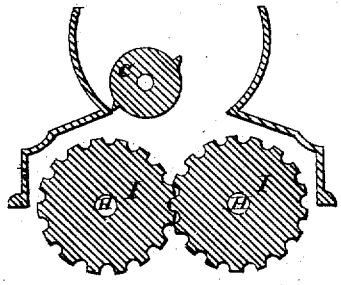
Figure 4:
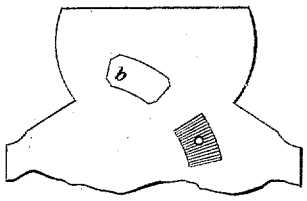
Figure 3:
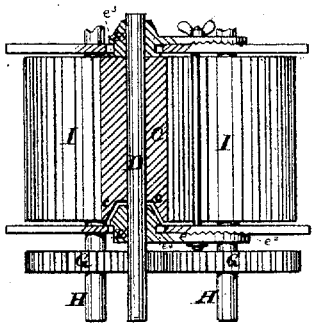

Figure 1 is a side elevation, having a part of the tooth-wheel broken away to show the movable bearing. Fig. 2 is a central sectional elevation, showing the relative position of rollers and casing. Fig. 3 is a plan of the machine taken in the line *x x*, Fig. 1. Fig. 4 is a side elevation of that portion of the casing which is provided with a slot for the reception of the movable bearing; it also exhibits the serrated face, against which the bearing is secured.

Like letters of like kind refer to like parts.

This invention consists mainly in the peculiar construction of the crusher-roller, and in the construction and arrangement of the gears. It further consists, also, in certain other details of construction, which will be fully described hereinafter.

In the drawing, A represents the hopper, of ordinary construction. B represents the casing, made of metal. This is provided on its sides with slots *b b*, of any desirable shape or form, for the reception of the bearings, hereinafter described. C represents the crusher-roller, which is fastened to the shaft D. The crusher-roller is provided at the gear end with a conical depression, *c*, for the reception of the bearing E, which projects inwardly through the side of the casing. The object in projecting the bearing thus inwardly into the roller is to secure the required length of the bearing without extending it beyond the outside of the casing. The same result may be secured by extending the bearing outwardly, and into a depression that the gear may be provided with; or the bearing may extend into both roller and gear. The arrangement described enables the roller to extend nearly the width of the casing, and the gear to be brought near the roller. The gear is fastened to the shaft D, which extends through the bearing E. To provide for the relative adjustment of the crusher-roller and that part of the casing termed the concave, the bearings E E are provided with arms *e e*, preferably extended backward and downward, and provided near their lower ends with slots $e^1$ $e^1$, for the purpose of attachment to the casing by any suitable means. The arms *e e* are further provided, at their lower ends and on their inner faces, with serrations $e^2$ $e^2$, which, when the arms are in position, engage in corresponding serrations on the sides of the casing, and enable the arms to be held more firmly in any desired position. As these serrations are not essential, they may be dispensed with, if preferred. The bearings E E are further provided with flanges $e^3$ $e^3$, which, when the parts are in place, come between the end of the roller and the sides of the casing. These flanges serve to keep the roller in place and to cover the slots. To adjust the roller to the concave, the bearings are moved in the slots *b b* to the point desired, and by tightening the thumb-screw *f* are held firmly.

By using a detachable bearing in combination with a metallic casing, it is easy to replace a bearing that is worn or broken, without renewing the casing.

The lower rollers I I are cast upon wrought-iron shafts H H, upon which are also cast the gears G G. The roller and gears are placed any suitable distance apart, the only connection between them being the shaft.

By this construction and arrangement several advantages accrue: First, there being no fitting of wheel or roller to shaft, it is economical. Second, the wheel, the roller, and shaft forming one mass, any derangement in the relative position of wheel and roller is prevented. It is desirable that the movements of the wheels and the rollers should coincide exactly, as otherwise the flutings of the lower rollers, which are similar in size and shape, and which turn with equal velocity, would not accurately engage, and, in consequence, would be liable to breakage. Third, there being no cast metal connecting the roller and gear, the necessity for casting both simultaneously is obviated. They can be cast successively if preferred. Fourth, the spaces on the shafts between the rollers and gears can be utilized for journals if desired. By arranging the gearing outside the casing the pomace is kept out of the way of the teeth; and by constructing the gear-wheels of equal size a uniform velocity is imparted to the rollers, and thereby better results are obtained.

Having described my invention, what I claim as new therein, and desire to secure by Letters Patent, is—

1. In a cider-mill, the crusher-roller C, having the depression *c*, substantially as described and shown.

2. The crusher-roller gearing outside of the casing, cast upon its shaft, and detachable with the shaft from the roller inside of the casing, substantially as described and shown.

3. The combination of the crusher-roller, having adjustable bearings with flanges, the slotted slides *e e*, and the casing B, substantially as described and shown.

4. The combination of the crusher-roller C, adjustable in the curved slots *b b*, and the rollers I I, substantially as described and shown.

5. In a cider-mill, the casing B, provided with the slots *b b*, adapted for the reception of the bearings of the adjustable roller C, substantially as described and shown.

This specification signed and witnessed this 10th day of April, 1874.

HENRY L. WHITMAN.

Witnesses:
GEO. L. DYER,
CHAS. THURMAN.